United States Patent [19]

Hatori et al.

[11] Patent Number: 4,571,618
[45] Date of Patent: Feb. 18, 1986

[54] TV SIGNAL MEDIAN PREDICTION CODING SYSTEM

[75] Inventors: Yoshinori Hatori, Kawasaki; Hitomi Murakami, Yokohama; Shuichi Matsumoto, Tokyo, all of Japan

[73] Assignee: Kokusai Denshin Denwa Kabushiki Kaisha, Tokyo, Japan

[21] Appl. No.: 351,356

[22] Filed: Feb. 23, 1982

[30] Foreign Application Priority Data

Aug. 27, 1981 [JP] Japan ................................ 56-133279

[51] Int. Cl.$^4$ ............................................. H04N 7/12
[52] U.S. Cl. ..................................................... 358/136
[58] Field of Search ........................ 358/133, 135, 136

[56] References Cited

U.S. PATENT DOCUMENTS

| | | | |
|---|---|---|---|
| 2,905,756 | 9/1959 | Graham | 358/135 |
| 4,141,034 | 2/1979 | Netravali et al. | 358/135 |
| 4,144,547 | 3/1979 | Stoffel | 358/133 |
| 4,217,609 | 8/1980 | Hatori et al. | 358/136 |

*Primary Examiner*—Edward L. Coles, Sr.
*Attorney, Agent, or Firm*—Robert E. Burns; Emmanuel J. Lobato; Bruce L. Adams

[57] ABSTRACT

A TV signal median prediction coding system in which a prediction value of a picture element to be coded is obtained from information of an already coded picture element and a difference between the prediction value and the value of the picture element to be coded is coded. In accordance with the present invention there is provided a storage section having a capacity large enough to store input TV signals of at least one frame at all times; an intrafield prediction section which, when supplied with a value $X_1$ of the latest input picture element of the TV signal, produces a prediction value $\bar{X}_{1N}$ of the latest input picture element using a value of a picture element of the same field as the latest input picture element, read out from the storage section; an interfield prediction section which, when supplied with the value $X_1$ of the latest input picture element, produces a prediction value $\bar{X}_{1K}$ of the latest input picture element using picture elements of the same field as the latest input picture element and the immediately preceding field, read out from the storage section; an interframe prediction section which, when supplied with the value $X_1$ of the latest input picture element, produces a prediction value $\bar{X}_{1F}$ of the latest input picture element using picture elements of the same field as the latest input picture element, the immediately preceding input picture element, the immediately preceding frame; and an adaptive control section which compares the intrafield prediction value $\bar{X}_{1N}$, the interfield prediction value $\bar{X}_{1K}$ and the interframe prediction value $\bar{X}_{1F}$ in magnitude and selects a median of them as the latest input picture element value $\bar{X}_1$.

1 Claim, 8 Drawing Figures

TV SIGNAL MEDIAN PREDICTION CODING SYSTEM

BACKGROUND OF THE INVENTION

The present invention relates to a prediction coding system which permits high-efficiency coding of a picture signal such as of commercial television or video telephone through utilization of the high correlation present between adjacent picture elements in a picture.

In the existing standard television a picture is made up of frames which are transmitted by steps of thirty in a second, and each frame consists of two continuous fields because of interlaced scanning every other scanning line. Elements which make up the picture are called "picture elements" but, in this specification, as digital processing is borne in mind, one sample after being subjected to sampling will hereinafter be referred to as a picture element. Accordingly, in this case, the position of each picture element in the frame depends on the sampling frequency used for digitizing a signal.

The background of the present invention will be clearly understood from the following detailed description.

SUMMARY OF THE INVENTION

An object of the present invention is to provide a TV signal median prediction coding system which employs interframe, interfield and intrafield adaptive predictions and does not require transmission of information on the selected prediction function to the receiving side, permitting a substantial reduction of the amount of information required to be transmitted, as compared with the system of the aforementioned prior application.

In accordance with the present invention, there is provided a TV signal median prediction coding system, in which a prediction value of a picture element to be coded is obtained from information of an already coded picture element and a difference between the prediction value and the value of the picture element to be coded is coded, characterized by a storage section having a capacity large enough to store input TV signals of at least one frame at all times; an intrafield prediction section which, when supplied with a value $X_1$ of the latest input picture element of the TV signal, produces a prediction value $\overline{X}_{1N}$ of the latest input picture element using a value of a picture element of the same field as the latest input picture element, read out from the storage section; an interfield prediction section which, when supplied with the value $X_1$ of the latest input picture element, produces a prediction value $\overline{X}_{1K}$ of the latest input picture element using picture elements of the same field as the latest input picture element and the immediately preceding field, read out from the storage section; an interframe prediction section which, when supplied with the value $X_1$ of the latest input picture element, produces a prediction value $\overline{X}_{1F}$ of the latest input picture element using picture elements of the same field as the latest input picture element, the immediately preceding frame; and an adaptive control section which compares the intrafield prediction value $\overline{X}_{1N}$, the interfield prediction value $\overline{X}_{1K}$ and the interframe prediction value $\overline{X}_{1F}$ in magnitude and selects a median of them as the latest input picture element value $\overline{X}_1$.

BRIEF DESCRIPTION OF THE DRAWINGS

The present invention will be described in detail below in comparison with conventional arts with reference to the accompanying drawings, in which.

DETAILED DESCRIPTION

Figure 1:
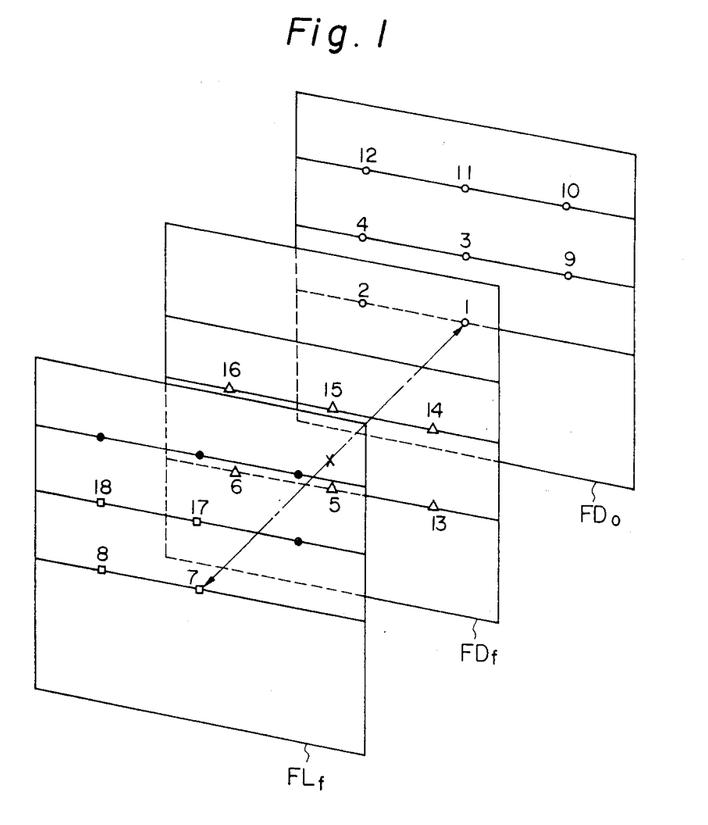
FIG. 1 is a diagram showing the positional relationships of respective picture elements for use in producing a prediction value according to the present invention.

A description will be given first of an example of a conventional coding system called interfield, intrafield adaptive coding system (see Japanese Pat. Appln. No. 31071/9). FIG. 1 is illustrative of position interrelation of picture elements 1 to 18. Now, as the sampling frequency is selected to be an integral multiple of the horizontal scanning frequency, the picture elements are arranged in an orthogonal pattern and, on account of interlaced scanning, lines of a previous field lie above and below a current scanning line of a current field. At this time, the picture element 2 lies on the same line as the current picture element 1 and on the left side thereof; the picture elements 3 and 4 lie two lines above the picture elements 1 and 2 in the same field and just above them, respectively; and the picture elements 5 and 6 lie one line below the picture elements 1 and 2 in the immediately preceding field and just below them, respectively. In this case, since it is considered that some adjoining ones of the picture elements have a high correlation, it is possible to perform high-efficiency coding with a reduced number of required bits for transmission by the following method : A prediction value $\overline{X}_1$ of a sampled value $X_1$ of the picture element 1 is obtained in the following form using sampled values of the adjoining picture elements:

$$\overline{X}_{1N} = \tfrac{3}{4}X_2 + X_3 - \tfrac{3}{4}X_4 \tag{1}$$

or $$\overline{X}_{1K} = \tfrac{3}{4}X_2 + X_5 - \tfrac{3}{4}X_6 \tag{2}$$

A difference between the prediction value $\overline{X}_{1N}$ or $\overline{X}_{1K}$ and a true value $X_1$ $$Ox_{1N} = X_1 - \overline{X}_{1N} \tag{3}$$

or $$Ox_{1K} = X_1 - \overline{X}_{1K} \tag{4}$$

is used as a prediction error, and coding is performed quantizing the prediction error. Expression (1) shows a method for obtaining a prediction value in conventional intrafield prediction coding and expression (2) a method for obtaining a prediction value in interfield prediction coding.

With the interfield prediction coding, in the case of a still picture, since the picture element values $X_1$ and $X_2$ and those $X_5$ and $X_6$ correspond to sampled values of positions close thereto in the picture, they have high correlation to each other and consequently high coding efficiency can be achieved. In case of a moving picture, however, the correlation between the points 1 and 2 and those 5 and 6 is lowered corresponding to the distances therebetween in the picture in dependence on the movement of the picture in one field period (1/60 sec), resulting in decreased coding efficiency. On the other hand, the intrafield prediction coding in the case of the still picture, does not exhibit so high coding efficiency as does the interfield prediction coding; however, also in the case of the moving picture, the position interrelation in the picture between the picture elements 1 and 2 and those 3 and 4 remains unchanged and, in addition, resolution of the picture is lowered by the integration effect of a TV camera and consequently the correlation between the picture elements increases by that, making it possible to raise the coding efficiency to some extent.

Therefore, according to the interfield or intrafield adaptive prediction coding system, by comparing the prediction values obtained with the intrafield prediction coding and the interfield prediction coding method and using that one of them which is closer to the true picture element value, it is possible to achieve for the still picture, high coding efficiency mainly by the interfield prediction coding and, for the moving picture, stable coding efficiency by the intrafield prediction coding.

With the abovesaid system, however, as it is necessary to send to the receiving side mode information indicating which one of the prediction values by the intrafield prediction coding and the interfield prediction coding was used, it is impossible to markedly reduce the total amount of required information to be transmitted, including the abovesaid information.

A system for resolving the above-mentioned problem is disclosed in U.S. Pat. No. 4,217,609, in which a plurality of successive picture elements (e.g. eight picture elements), horizontally arranged, are formed into one block. With this known conventional system, it is possible to reduce the number of required bits for the mode information in terms of a unit picture element. In this known conventional system, however, since suitable selection of the prediction values can be performed only for each block, an adaptive control cannot be carried out for each picture element. Accordingly, a factor for improving the picture quality effected by adaptive control is lowered by a corresponding rate.

A system that has heretofore been proposed as a solution to these problems is "interframe, intrafield adaptive prediction system" (Shingaku Giho, CS77-48, July 1977). According to this system, interframe and intrafield prediction values are employed but it is prearranged between the transmitting and receiving sides which one of the prediction values is used at the starting point of each scanning line of the picture and, for each of the subsequent picture elements, use is usually made of a prediction function employed for the immediately preceding picture element. However, in the case where the resulting prediction error value exceeds a predetermined threshold value, use is thereafter made of the prediction function which has not been employed until then. According to this system, the information indicating which one of the prediction functions was used is available from the prediction error value transmitted, so the information need not separately be transmitted to the receiving side, achieving a relatively high compression ratio. With this method, however, the prediction function for the next picture element cannot be determined before the immediately preceding picture element is coded and this calls for a complex circuit arrangement. In addition, as such a prediction function is used that the prediction error was smaller than the threshold value with respect to the immediately preceding picture element, it is not guaranteed that the prediction function is an optimum one, and this system is not so effective with respect to a portion of the picture in which a fine pattern or abrupt edge exists to provide a change in characteristics, that is, a portion of the picture which has important information visually.

The present invention eliminable of the above defects of conventional arts will hereinafter be described in detail.

The present invention employs the aforesaid expression (1) as the intrafield prediction function, the aforesaid expression (2) as the interfield prediction function and the following expression as the interframe prediction function:

$$\overline{X}_{1F} = \tfrac{3}{4} X_2 + X_7 - \tfrac{3}{4} X_8 \tag{5}$$

where $X_7$ and $X_8$ are picture element values of the picture elements which respectively lie at the same positions as the current picture element $X_1$ and the picture element lying on the left side thereof, and exist in the picture of the preceding frame as shown in FIG. 1.

In a still picture, picture element values of successive frames bear the following relationships:

$$X_1 \simeq X_7 \tag{6}$$

$$X_2 \simeq X_8 \tag{7}$$

Accordingly, the prediction value $\overline{X}_{1F}$ obtainable with the abovesaid expression (5) becomes very close to the current picture element value $X_1$. On the other hand, since the relations of expressions (6) and (7) do not hold in a moving picture, the prediction goes wider than in the cases of the interfield and the intrafield prediction.

Therefore, it is necessary to adaptively select these three prediction functions. Now, consider that intrafield, interfield and interframe prediction values $\overline{X}_{1N}$, $\overline{X}_{1K}$ and $\overline{X}_{1F}$ are compared in magnitude, and that the median prediction value is selected as a prediction value of the current picture element. Now, assuming that the prediction values bear the following relation:

$$\overline{X}_{1N} > \overline{X}_{1K} > \overline{X}_{1F} \tag{8}$$

the prediction function which provides the second largest prediction value $\overline{X}_{1K}$ is selected according to the prediction function selecting algorithm which is characteristic of the present invention.

Figure 2:
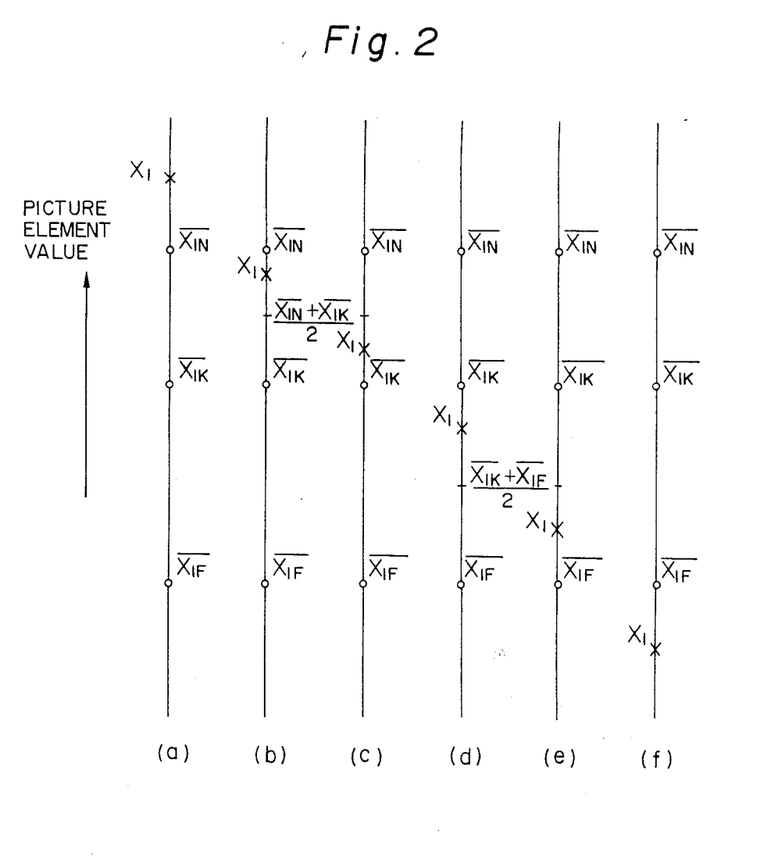
FIG. 2 is a diagram explanatory of the effectiveness of the algorithm for comparing three prediction values in magnitude and selecting a median one of them as a prediction value of the current picture element.

A description will hereinafter be given of the prediction function selecting algorithm in the present invention being effective, for example, in respect of the case where expression (8) holds true. When expression (8) holds, the current picture element value $X_1$ may bear six relationships to the prediction values $\overline{X}_{1N}$, $\overline{X}_{1K}$ and $\overline{X}_{1F}$ as shown in FIGS. 2(a) to (f). When $$X_1 \leq (\overline{X}_{1N} + \overline{X}_{1K})/2 \quad (9)$$

or $$X_1 \geq (\overline{X}_{1K} + \overline{X}_{1F})/2 \quad (10)$$

as depicted in FIGS. 2(c) and (d), the prediction function which minimizes an error in predicting the picture element 1 becomes $\overline{X}_{1K}$ and, by the abovesaid selecting algorithm, an optimum prediction fuction is selected.

On the other hand, in FIGS. 2(b) and (e), $$\overline{X}_{1N} \geq X_1 > (\overline{X}_{1N} + \overline{X}_{1K})/2 \quad (11)$$

$$\overline{X}_{1F} \leq X_1 < (\overline{X}_{1K} + \overline{X}_{1F})/2 \quad (12)$$

Therefore, $\overline{X}_{1N}$ of $\overline{X}_{1N}$ is optimum as the prediction value but, also in this case, the selection of $\overline{X}_{1K}$ means a selection of the second best function and, in addition, an increase in the prediction error is smaller than $\overline{X}_{1N} - \overline{X}_{1K}$ or $\overline{X}_{1K} - \overline{X}_{1F}$ as compared with the case of the optimum function being selected, so loss due to the selection of the second best prediction function is small in general.

Usually the prediction values $\overline{X}_{1N}$, $\overline{X}_{1K}$ and $\overline{X}_{1F}$ are close to the current picture element value $X_1$, and hence the $X_1$ assumes the values shown in FIGS. 2(b) to 2(e) in many cases. Rarely it may be larger or smaller than any of the prediction values as shown in FIG. 2(a) or (f) but, also in this case, according to the algorithm characteristic of the present invention, the second best prediction function is selected. An increase in the prediction error in this case is or $\overline{X}_{1N} - \overline{X}_{1K}$ or $\overline{X}_{1K} - \overline{X}_{1F}$ and when the prediction values are close to one another, the loss resulting from the selection of the second best prediction function can be reduced to some extent.

It will be appreciated from the above that, according to the prediction function selecting algorithm of the present invention, the best or the second best prediction function can be selected, and that even if the second best function is selected, an increase in the prediction error is relatively small.

Moreover, in the system of the present invention described above, the intrafield, interfield and interframe prediction values $\overline{X}_{1N}$, $\overline{X}_{1K}$ and $\overline{X}_{1F}$ are produced using the values $X_2$ to $X_8$ of the picture elements already coded, and hence they can also be obtained at the receiving side in the same manner as at the transmitting side. Accordingly, it is also possible at the receiving side to select the same prediction function as that selected at the transmitting side by comparing the prediction values in magnitude and selecting the prediction function which provides the median prediction value. Accordingly, there is no need of transmitting the selected prediction function to the receiving side unlike in the case of the prior art system.

While in the foregoing the expressions (1), (2) and (5) are used as the prediction function in the present invention, the prediction function may also be other functions, for instance, such functions using the picture elements 2 to 18 in FIG. 1 as shown in Table 1.

TABLE 1

Interfield Prediction Function
$\overline{X}_1 = X_2 + X_3 - X_4$
$\overline{X}_1 = 3/4X_2 - 1/4X_3 + 1/4X_4 + 3/4X_{11} - 1/2X_{12}$
$\overline{X}_1 = 6/8X_2 + 1/8X_9 + 1/8X_4 + 1/8X_{10} + 6/8X_{11} - 5/8X_{12} - 2/8X_3$
$\overline{X}_1 = 5/8X_2 + 2/8X_9 - 4/8X_3 + 2/8X_{10} + 4/8X_{11} - 3/8X_{12} + 2/8X_4$ Interfield Prediction Function
$\overline{X}_1 = X_2 + X_5 - X_6$
$\overline{X}_1 = 3/4X_2 - 1/4X_{15} + 1/4X_{16} + 3/4X_5 - 1/2X_6$
$\overline{X}_1 = (X_{13} + 6X_5 + X_6 + X_{14} - 2X_{15} + X_{16})/8$ Interframe Prediction Function
$\overline{X}_1 = X_3 + X_7 - X_{17}$
$\overline{X}_1 = -X_3 + X_7 + X_{17} + X_2 + X_4 - X_8 - X_{18}$ Although the foregoing description has been given of the case of adaptively selecting the three prediction functions, the prediction function selecting algorithm characteristic of the present invention is also applicable to the case where more prediction functions are used. In general, when n prediction functions are used, it is sufficient to select, as the prediction function for the current picture element, a function which provides a prediction value $[n/2] + 1$st (where [ ] is discarded) from the largest one, for instance, when n=4, a third prediction value and when n=5, the third prediction value.

Figure 3:
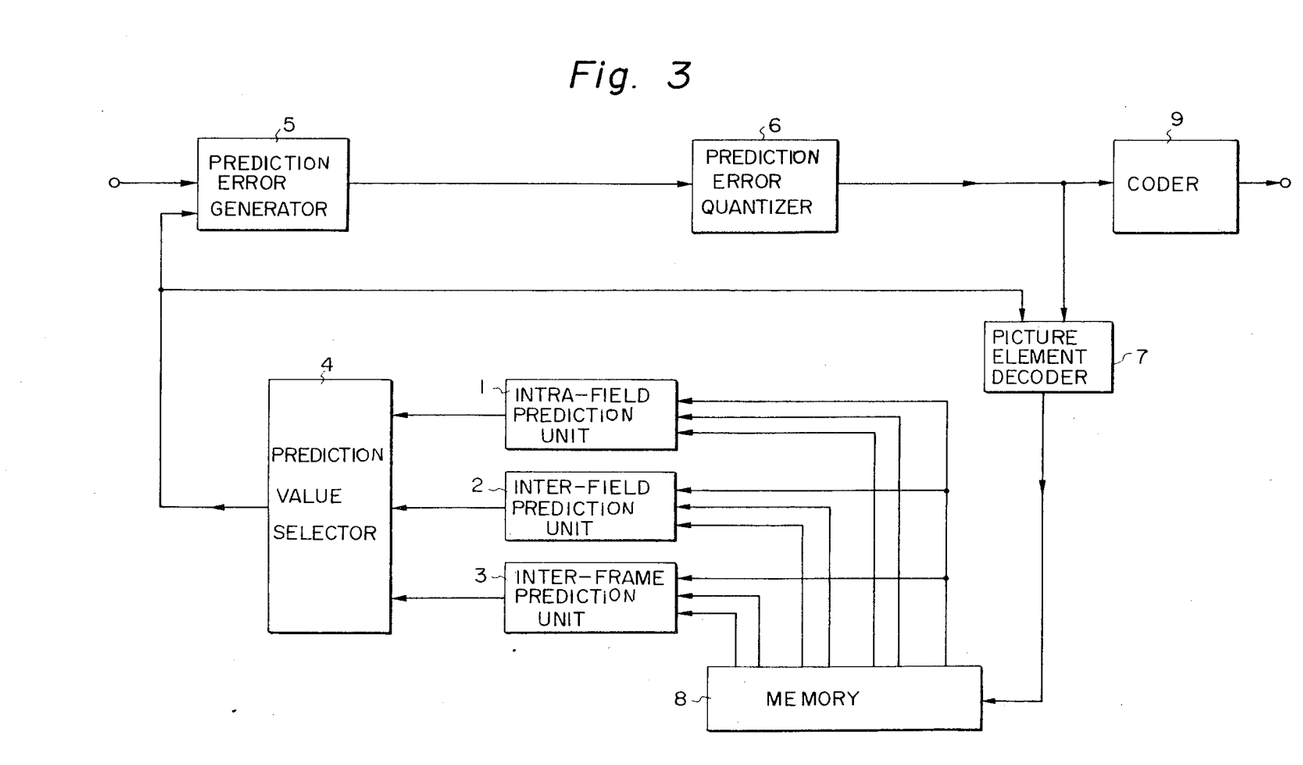
FIG. 3 is a block diagram illustrating an embodiment of the present invention.

A description will hereinafter be given of a specific example of the adaptive prediction coding system of the present invention. FIG. 3 is a block diagram showing the adaptive prediction coding system of the present invention at the transmitting side. Reference numeral 1 indicates an intrafield prediction section; 2 designates an interfield prediction section; 3 identifies an intraframe prediction section; 4 denotes a prediction value selecting section for selecting one of the three prediction values; 5 represents a prediction error forming section for producing a difference between an input picture element value and the prediction value; 6 shows a prediction error quantizing section for quantizing the prediction error; 7 refers to a picture element decoding section for decoding the input picture element value from the quantized prediction error and the prediction value; 8 indicates a storage section for storing TV signals of substantially one frame; and 9 designates a transmission signal coding section for coding the quantized prediction error into a transmission signal for output on a transmission line.

Figure 4:
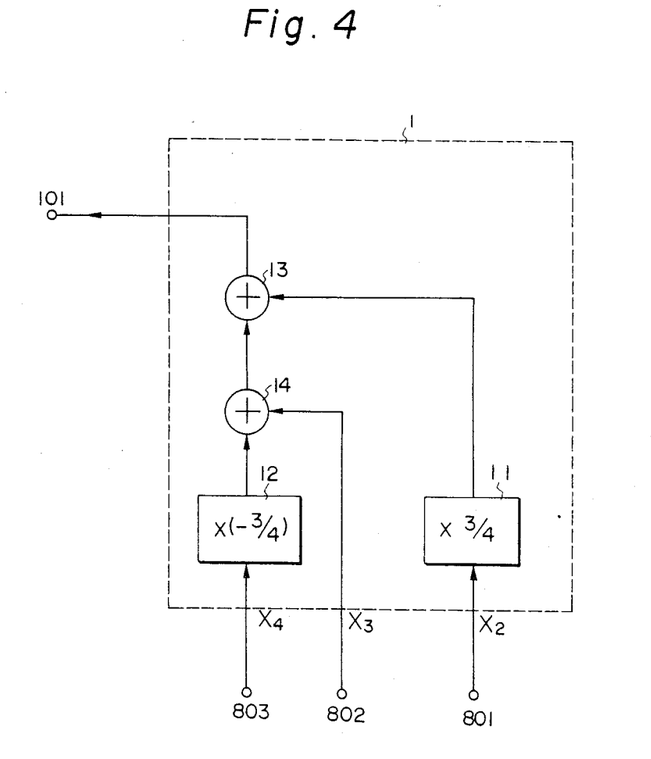
FIG. 4 is a block diagram showing a specific example of a section for an intrafield prediction in the embodiment of FIG. 3.

FIG. 4 illustrates, by way of example, the arrangement of the intrafield predicting section 1. In FIG. 4, reference numerals 801 to 803 indicate decoded values $X_2$ to $X_4$ of the picture elements 2 to 4, which decoded values are supplied from the storage section 8; 11 and 12 designates coefficient calculators, which respectively perform multiplications $\frac{3}{4}$ and $-\frac{3}{4}$ using a shift register, an adder and a subtractor; and 13 and 14 identify adders. With the above circuit arrangement, the intrafield prediction value $\overline{X}_{1N}$ for the current picture element 1 is provided as given by the aforementioned expression (1) and the prediction value is applied to the prediction value selecting section 4 as indicated by 101.

The interfield prediction section 2 is identical in construction with the intrafield prediction section 1 except that decoded values $X_2$, $X_5$ and $X_6$ of the picture elements 2, 5 and 6 are supplied as input signals from the storage section 8, and that the interfield prediction value shown by the aforesaid expression (2) is outputted as indicated by 201. The interframe prediction section 3 is also identical in construction with the intrafield prediction section except that decoded values $X_2$, $X_7$ and $X_8$ of the picture elements, 2, 7 and 8 are supplied as input signals from the storage section 8, and that the interframe prediction value shown by the aforementioned expression (5) is outputted as indicated by 301.

Figure 5:
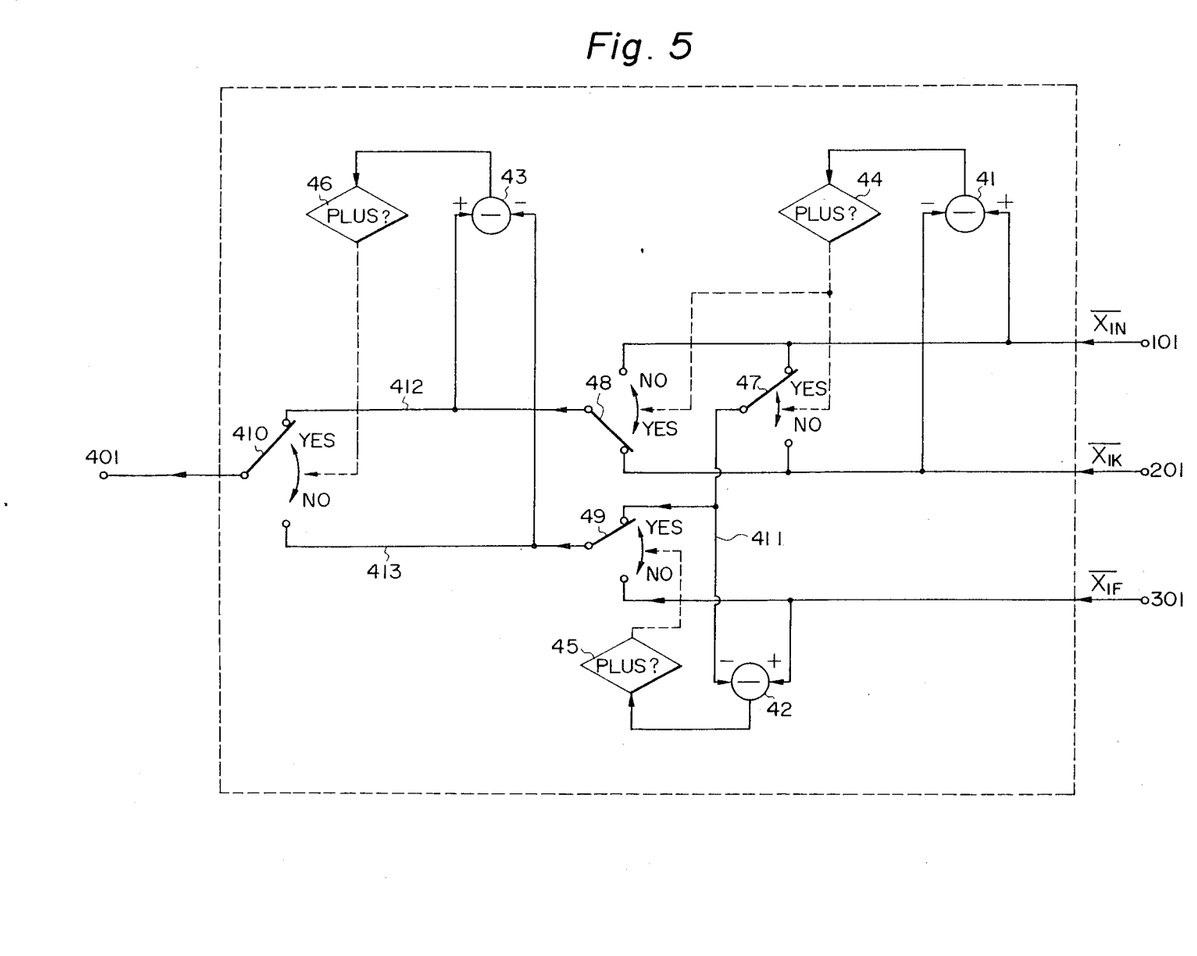
FIG. 5 is a block diagram showing a specific example of a prediction value selecting section for use in the embodiment of FIG. 3.

Next, a description will be given of the prediction value selecting section 4 which is characteristic of the present invention. FIG. 5 is explanatory of an example of the arrangement of the prediction value selecting section 4. In FIG. 5, reference numerals 101, 201 and 301 indicate the intrafield, interfield and interframe prediction values $\overline{X}_{1N}$, $\overline{X}_{1K}$ and $\overline{X}_{1F}$, respectively; 41 to 43 designate circuits each of which obtains a difference between two input signals; 44 to 46 identify decision circuits each of which sends out switching information to a switch depending on whether the difference is positive or negative; and switches 47 to 410 are circuits each of which selects one of two inputs in accordance with an instruction from one of the decision circuits 44 to 46.

The intrafield prediction value $\overline{X}_{1N}$ and the interfield prediction value $\overline{X}_{1K}$ are substracted by the difference circuit 41 and the switch 47 is changed over by the decision circuit 44 depending on whether the output from the difference circuit is positive or negative. When the difference value is positive, that is, when $\overline{X}_{1N} \geq \overline{X}_{1K}$, $\overline{X}_{1N}$ is selected and, in the opposite case, $\overline{X}_{1K}$ is selected, in consequence of which a larger one of them is sent out as an output 411. Similarly, at an output 412 is provided a smaller one of $\overline{X}_{1N}$ and $\overline{X}_{1K}$. At an output 413 is provided a larger one of the output 411 and $\overline{X}_{1F}$ and, at an output 401 is provided a larger one of the outputs 412 and 413. By the above combination of the selecting circuits, it is possible to send out at the output 401 a prediction value which always provides a median value with respect to all possible combinations of $\overline{X}_{1N}$, $\overline{X}_{1K}$ and $\overline{X}_{1F}$ in terms of magnitude, as shown in Table 2.

Figure 6:
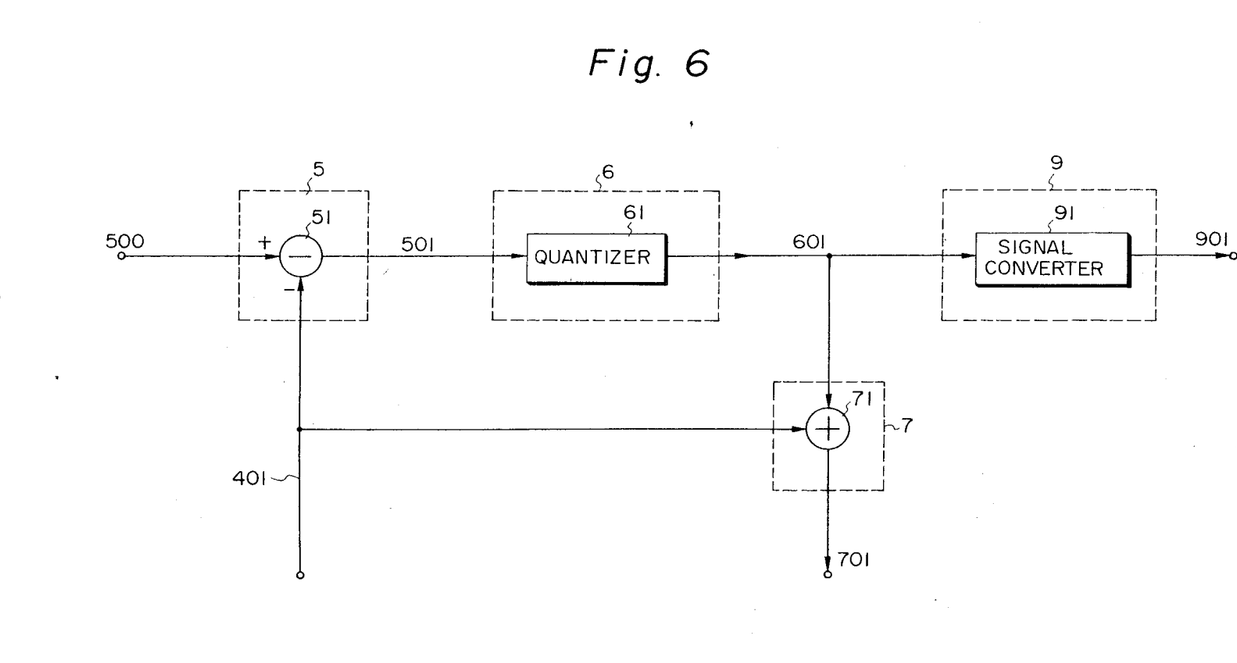
FIG. 6 is a block diagram illustrating specific examples of a prediction error generating section, a prediction error quantizing section, a transmission signal coding section and a picture element decoding section for use in the embodiment of FIG. 3.

FIG. 6 is a diagram illustrating, by way of example, the arrangement of each of the prediction error generating section 5, the prediction error quantizing section 6, the picture element decoding section 7 and the transmission signal coding section 9. In the prediction error generating section 5 a difference is subtracted by a difference circuit 51 between the latest input picture element value 500 and the median prediction value for the current picture element selected by the prediction value selecting section 4 and a prediction error $X_1 - \overline{X}_1$ (where $\overline{X}_1$ is a selected prediction value) is provided as an output 501. In the prediction error quantizing section 6 the output is quantized at discontinuous output levels. For instance, when the input signal is 9-bit, 512-level, the prediction error signal has a total of 1023 levels, including both positive and negative ones, and the signal is quantized to have, for example, 27 levels, including both positive and negative ones, and it is derived at an output 601. A quantizing circuit 61 therefore is constituted by a read only memory. Further, in the transmission signal coding section 9, the quantized output value 601 is coded into a transmission signal, for example, seven adjoining levels including zero level are represented by three bits, a total of six levels, i.e. three levels on each of the positive and negative sides of the above seven adjoining levels by six bits and a total of 14 levels or seven levels on each of the positive and negative sides of the respective three levels by "nine bits;" thereafter, the signal is provided as an output 901 on the transmission line. A code converter circuit 91 is constituted by a read only memory. In the picture element decoding section 7 the quantized prediction error 601 and the prediction value are added by the adder circuit 7 to produce a decoded value 701 of the coded picture element 1, which is sent out for storage in the storage section 8 so that it may be used for the prediction of the subsequent picture elements.

Figure 7:
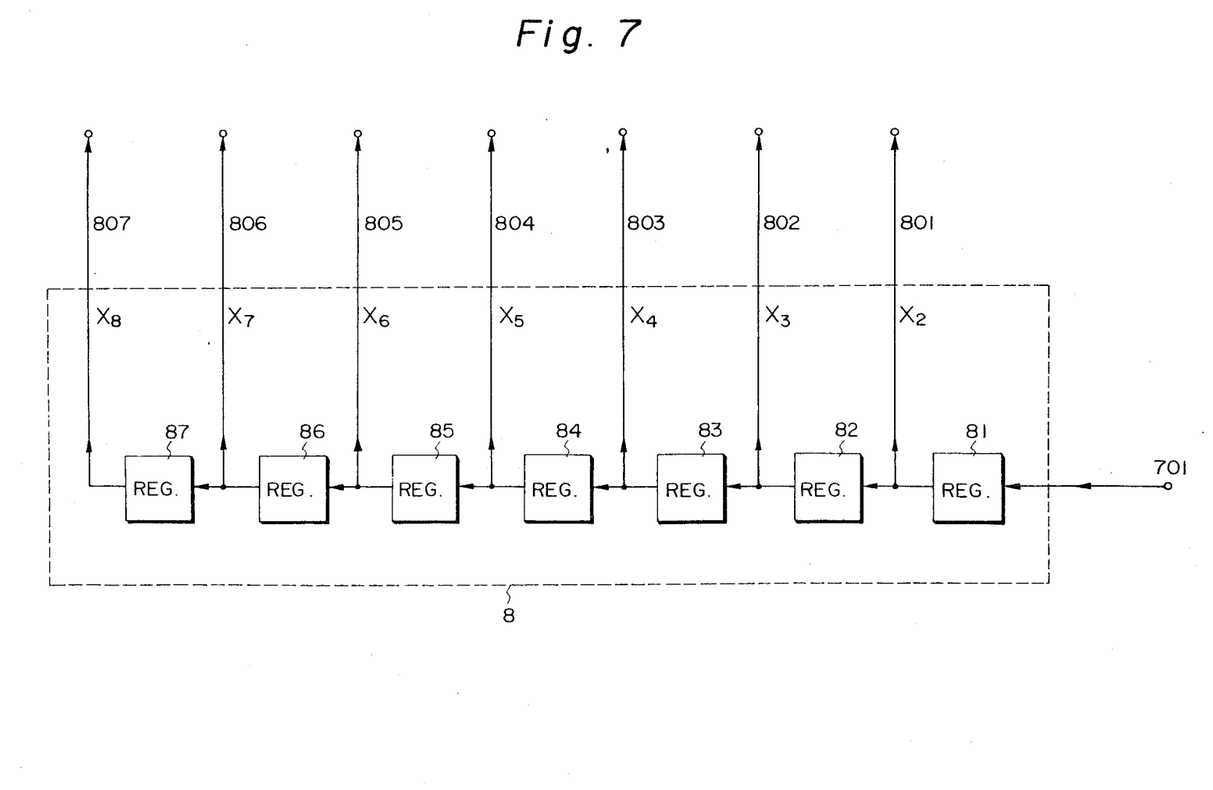
FIG. 7 is a block diagram showing a specific example of a storage section for use in the embodiment of FIG. 3.

FIG. 7 is explanatory of an example of the arrangement of the storage section 8. In FIG. 7, reference numeral 701 indicates a decoded value from the picture element decoding section; and 81 to 87 designate seven registers, the delay time by each register being set as shown in Table 3.

TABLE 3

| Register No. | Delay time in each register | Output delay time of each register as viewed from input point 80 |
|---|---|---|
| 81 | 1P | 1P |
| 82 | 1L − 1P | 1L |
| 83 | 1P | 1L + 1P |
| 84 | 261L − 1P | 262L |
| 85 | 1P | 262L + 1P |
| 86 | 263L − 1P | 525L |
| 87 | 1P | 525L + 1P |

TABLE 2

| Output | Case $\overline{X}_{1N} \geq \overline{X}_{1K} \geq \overline{X}_{1F}$ | $\overline{X}_{1F} \geq \overline{X}_{1K} \geq \overline{X}_{1N}$ | $\overline{X}_{1K} \geq \overline{X}_{1N} \geq \overline{X}_{1F}$ | $\overline{X}_{1F} \geq \overline{X}_{1N} \geq \overline{X}_{1K}$ | $\overline{X}_{1K} \geq \overline{X}_{1F} \geq \overline{X}_{1N}$ | $\overline{X}_{1N} \geq \overline{X}_{1F} \geq \overline{X}_{1K}$ |
|---|---|---|---|---|---|---|
| Output 411 (larger one of $\overline{X}_{1N}$ and $\overline{X}_{1K}$) | $\overline{X}_{1N}$ | $\overline{X}_{1K}$ | $\overline{X}_{1K}$ | $\overline{X}_{1N}$ | $\overline{X}_{1K}$ | $\overline{X}_{1N}$ |
| Output 412 (smaller one of $\overline{X}_{1N}$ and $\overline{X}_{1K}$) | $\overline{X}_{1K}$ | $\overline{X}_{1N}$ | $\overline{X}_{1N}$ | $\overline{X}_{1K}$ | $\overline{X}_{1N}$ | $\overline{X}_{1K}$ |
| Output 413 (larger one of output 411 and $\overline{X}_{1F}$) | $\overline{X}_{1F}$ | $\overline{X}_{1K}$ | $\overline{X}_{1F}$ | $\overline{X}_{1N}$ | $\overline{X}_{1F}$ | $\overline{X}_{1F}$ |
| Output 401 (larger one of outputs 412 and 413) | $\overline{X}_{1K}$ | $\overline{X}_{1K}$ | $\overline{X}_{1N}$ | $\overline{X}_{1N}$ | $\overline{X}_{1F}$ | $\overline{X}_{1F}$ |

In the above table, 1P is a delay of one picture element, 1L is a delay of one line, 262L is a delay of 262 lines = a delay of one field and 525L is a delay of 525 lines = a delay of one frame. Thus, at the outputs 801 to 807 of the registers 81 to 87 are read out decoded values $X_2$ to $X_8$ of th picture elements 2 to 8.

Figure 8:
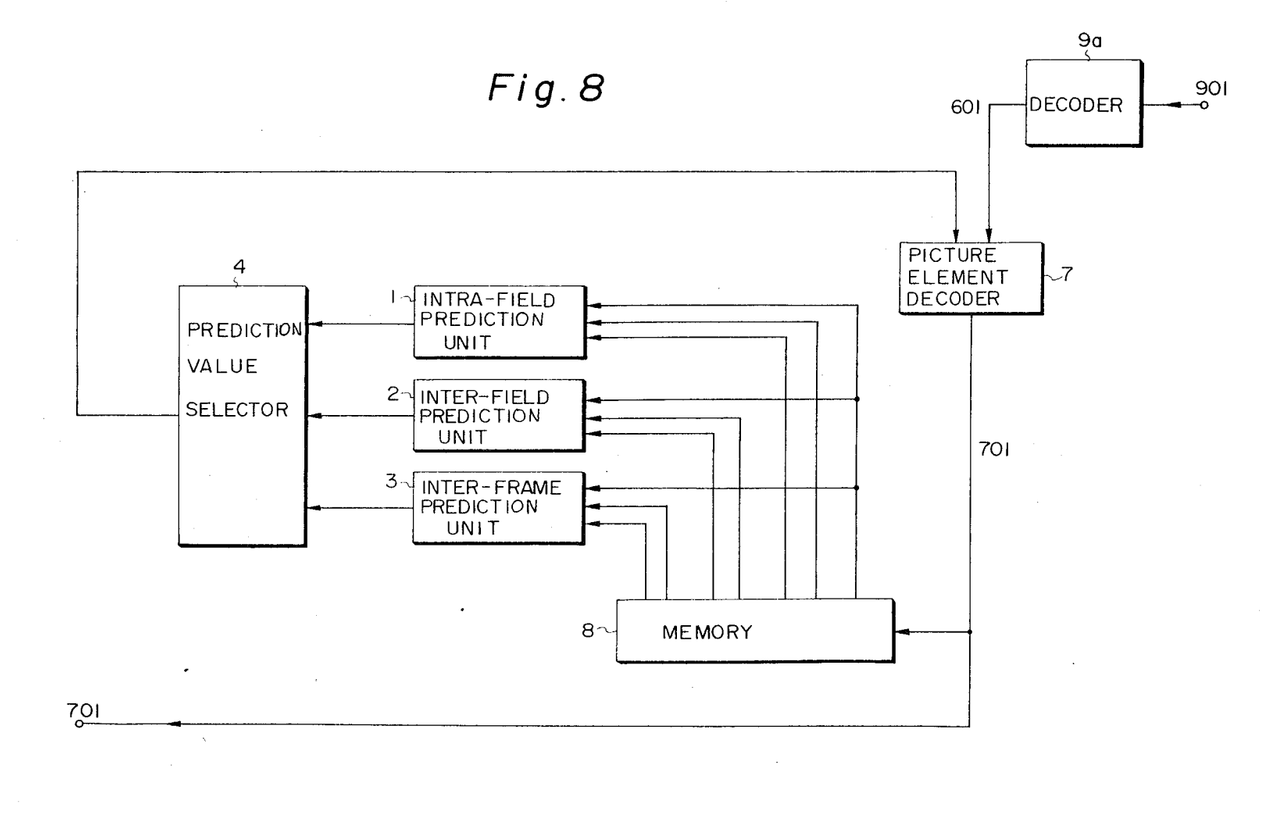
FIG. 8 is a block diagram illustrating an example of the arrangement of the receiving side for decoding a signal transmitted according to the present invention.

The above has described an example of the arrangement of the transmitting side of the adaptive prediction coding system of the present invention. FIG. 8 is a block diagram illustrating the arrangement for decoding the coded transmitted signal at the receiver. In FIG. 8, reference numeral 9a indicates a transmitted signal decoding section corresponding to the transmission signal coding section 9 of the transmitter, by which a transmitted signal 901 is decoded into the quantized prediction error signal 601. A decoding circuit is constituted by a read only memory as in the case with the transmission signal coding circuit of the transmitting side. The other intrafield prediction section 1, intrafield prediction section 2, interframe prediction section 3, prediction value selecting section 4, picture element decoding section 7 and storage section 8 are identical in construction with the corresponding sections of the transmitting side, and the picture element value 701 decoded by the abovesaid sections is obtained at the receiving side.

As has been described in the foregoing, the present invention is to provide a coding system which uses an intrafield prediction value, an interfield prediction value and an interframe prediction value, compares these three prediction functions in magnitude with one another, select a median one of the prediction values as a prediction value of the current picture element and sends out its prediction error, thereby making it possible to transmit the TV signal with a small amount of required capacity for transmission.

What we claim is:

1. In a TV signal median prediction coding system in which a prediction value of a picture element to be coded is obtained from information of an already coded picture element and a difference between the prediction value and the value of the picture element to be coded is coded, the improvement comprising; a storage section having a capacity large enough to store input TV signals of at least one frame at all times; an intrafield prediction section which, when supplied with a value $X_1$ of the latest input picture element of the TV signal, produces a prediction value $\overline{X}_{1N}$ of the latest input picture element using a value of a picture element of the same field as the latest input picture element, read out from the storage section; and an interfield prediction section which, when supplied with the value $X_1$ of the latest input picture element, produces a prediction value $\overline{X}_{1K}$ of the latest input picture element using a picture elements of the same field as the latest input picture element and the immediately preceding field, read out from the storage section; an interframe prediction section which, when supplied with the value $X_1$ of the latest input picture element produces a prediction value $\overline{X}_{1F}$ of the latest input picture element using picture elements of the same field as the latest input picture element, the immediately preceding frame; and an adaptive control section which compares the intrafield prediction value $\overline{X}_{1N}$, the interfield prediction value $\overline{X}_{1K}$ and the interframe prediction value $\overline{X}_{1F}$ in magnitude and selects a median value of the values compared as the latest input picture element value $\overline{X}_1$.

* * * * *